(12) United States Patent
Shibasaki et al.

(10) Patent No.: US 7,083,770 B2
(45) Date of Patent: Aug. 1, 2006

(54) AMORPHOUS, FINE SILICA PARTICLES, AND METHOD FOR THEIR PRODUCTION AND THEIR USE

(75) Inventors: Takeyoshi Shibasaki, Yokkaichi (JP); Kazuyoshi Honda, Yokkaichi (JP); Masamichi Murota, Yokkaichi (JP); Hirokuni Shirono, Yokkaichi (JP)

(73) Assignee: Nippon Aerosil Co., Ltd., Tokyo (JP)

( * ) Notice: Subject to any disclaimer, the term of this patent is extended or adjusted under 35 U.S.C. 154(b) by 444 days.

(21) Appl. No.: 10/049,902

(22) PCT Filed: Jun. 20, 2001

(86) PCT No.: PCT/JP01/05252

§ 371 (c)(1),
(2), (4) Date: Jul. 8, 2002

(87) PCT Pub. No.: WO01/98211

PCT Pub. Date: Dec. 27, 2001

(65) Prior Publication Data

US 2003/0152506 A1    Aug. 14, 2003

(30) Foreign Application Priority Data

Jun. 20, 2000 (JP) ............................. 2000-184160
Nov. 15, 2000 (JP) ............................. 2000-348537

(51) Int. Cl.
*C01B 33/18* (2006.01)
*C08K 3/36* (2006.01)
(52) U.S. Cl. ...................... 423/335; 423/336; 423/337; 430/108.7; 106/287.34; 106/482
(58) Field of Classification Search ................ 423/335, 423/336, 337; 430/108.7; 106/287.34, 482
See application file for complete search history.

(56) References Cited

U.S. PATENT DOCUMENTS

| 5,229,336 | A | * | 7/1993 | Akiyama et al. | ............. 501/56 |
| 5,904,159 | A | * | 5/1999 | Kato et al. | ..................... 134/7 |
| 6,077,640 | A |   | 6/2000 | Komai et al. | |
| 6,231,966 | B1 | * | 5/2001 | Nishino et al. | ............. 428/330 |
| 6,248,495 | B1 | * | 6/2001 | Inokuchi et al. | ......... 430/108.7 |
| 6,403,271 | B1 | * | 6/2002 | Suzuki et al. | ............ 430/108.6 |
| 6,649,696 | B1 | * | 11/2003 | Obrecht et al. | ............. 525/125 |

FOREIGN PATENT DOCUMENTS

| JP | 2-188421 | 7/1990 |
| JP | 7-261417 | 10/1995 |

(Continued)

*Primary Examiner*—Ngoc-Yen Nguyen
(74) *Attorney, Agent, or Firm*—Oblon, Spivak, McClelland, Maier & Neustadt, P.C.

(57) ABSTRACT

The amorphous-silica particle having 0.1–0.7 μm of the average particle diameter, 5–30 $m^2/g$ of the specific surface area, less than 40% of the dispersion coefficient, and 20 $\mu C/m^2$ of the absolute value of the triboelectrostatic charge, can be obtained, by setting flame temperature to more than melting point of silica, raising the silica concentration in a flame, and staying the generated silica particle in the flame for a short time to be grew up. Since this silica particle has a particle shape being near a true sphere, and a particle size of said particle is remarkably uniform, so it is suitable for a filler of a semiconductor sealing agent or various materials, etc. In addition, since said particle has strong electrification, it is also suitable for an outer or an inner additional agent of a toner for an electronic photograph, a photo conductor material for a electronic photograph, and a material of an electric charge transportation layer, etc.

19 Claims, 2 Drawing Sheets

FOREIGN PATENT DOCUMENTS

| | | |
|---|---|---|
| JP | 10-45974 | 2/1998 |
| JP | 2000-258947 | 9/2000 |

* cited by examiner

AMORPHOUS, FINE SILICA PARTICLES, AND METHOD FOR THEIR PRODUCTION AND THEIR USE

TECHNICAL FIELD OF THE INVENTION

This invention relates to an amorphous spherical silica particle, which is suitably as a filler for a semiconductor sealing agent, a filler for anti-blocking of a plastic film or sheet, an outer and an inner additional agents of a toner for an electronic photograph in a copying machine, a printer, a facsimile and a multi-functional system, etc., which are driven by an electronic photograph method, and a material of a surface protection layer or an electric charge transportation layer of a photo conductor for an electronic photograph, and its production process.

BACKGROUND OF THE INVENTION

Although a silica fine powder has been added as a filler to a semiconductor resin-sealing agent in order to improve a fluidity and a burr-proof property, this invention relates to an amorphous spherical silica particle suitable as this filler, and its production process. Moreover, although it is known that a blocking is prevented by adding the filler to a plastic film or sheet to form the fine irregularity on the surface of the film to decrease a contact area, the amorphous fine silica particle of this invention is also suitable as this filler.

Furthermore, an outer additional agent has been used to improve the fluidity, heat resistance, and long-term preservation of the toner for the electronic photograph, and said agent has also been used to control an electrification property, a cleaning characteristic, an adhesion property on a carrier or a surface of the photo conductor, and degradation behavior of a development material. In addition, an inner additional agent has been used to improve a durability of the toner for the electronic photograph, and to raise a durability of the surface protection layer of the photo conductor of the electronic photograph, which is loaded electrically or mechanically. This invention relates to the suitable amorphous spherical silica particle as a material used for the purpose of the improvement of the fluidity and the control of the electrification property, the improvement of the heat resistance and the long-term preservation, the control of a cleaning characteristic and adhesion property to the surface of the carrier or the photo conductor, and the control of the degradation of the development agent, by appending to the outside of the toner for the electronic photograph. Moreover, said silica particle is also used for the purpose of the durability improvement, by appending to the inside of the toner for the electronic photograph, and is also used in order to decrease the contact area to improve the durability, by forming the fine irregularity on the surface protection layer of the photo conductor of the electronic photograph, which is loaded by the electric or mechanical load.

Regarding the silica filler used as the semiconductor resin-sealing agent, it is good that said silica filler has high purity as much as possible to have a true spherical form, and has a suitable particle size distribution. Moreover, in order to have a high filling and the high fluidity, it is effective that said silica filler can be filled up in the fine space between these silica particles, and be improved the sliding between these particles. Therefore, the particle having 0.1–1 μm of an average diameter and 5–30 $m^2/g$ of a specific surface area by BET (hereafter it is said the specific surface area), has been used in general. Moreover, as the outer additional agent of the toner for the electronic photograph, the silica particle, or a titanium oxide particle, etc., having 0.006–0.040 μm of the average particle diameter, has been used now for the purpose of the improvement of the fluidity and the control of the electrification in general. In addition, as the inner additional agent, the silica particle having 0.005–0.040 μm of the average particle diameter, has been used, and is required that said silica particle has a sharp particle size distribution, in order to correspond to a high speed, a clear picture and the control of the degradation behavior of the development material etc. Furthermore, although the silica particle having 0.005–0.150 μm of the average particle diameter, has been used in order to raise the durability of the surface protection layer or the electric charge transportation layer of the photo conductor of the electronic photographic, the wet silica and the silica gel made by using sodium silicate as a raw material, have the problem that the content of alkaline metals, such as soda, is high. Therefore, the fine silica particle with few amounts of alkaline metals, having the suitable particle size, is required instead of said wet silica and silica gel. Moreover, regarding the conventional wet silica and silica gel made by using sodium silicate as the raw material, since an alkaline metal oxide, such as soda, is intermixed as an impurity, said silica has the fault, in which the electrification is low and a standup of the electrification is late, and also has a problem in the durability. Furthermore, the conventional silica powder used as the additional agent of the material of the electronic photograph has a problem that the particle size distribution is broad, and the average particle diameter is too small.

By the way, by the conventional sol-gel method, it is difficult to make a particle of less than 1 μm, and it is also difficult to obtain the fine silica particle having the particle size, which is preferable as such a material of the filler. Moreover, by the sol-gel method, even if the particle of less than 1 μm is made, growth and sintering of particles each other will arise at the time of burning to make a stable silica particle, so that the silica particle, which can be isodispersed, cannot be obtained while keeping said particle size stably. Moreover, the fine particle of the reaction products by sol-gel method, which is inadequate burning, has a problem that silanol groups and organic materials are remained too much and the compound, which is kneaded and filled up with said particle, generates gases at the time of injection molding or fabrication, so that said particle cannot be used for the filler for the semiconductor resin-sealing agent.

On the other hand, regarding the titanium dioxide particle, it is known that the process, in which the crystalline particle of more than 0.1 μm is made by using a titanium tetrachloride as the raw material to be oxidized directly under high temperature with oxygen gas. However, regarding a direct oxidation reaction of silica, since said reaction has to do under more high temperature than titanium dioxide, and the melting point (1730° C.) and the boiling point (2230° C.) are closed, so that the growth of the particle is not enough, and it is easy to become an ultra fine particle of less than 0.1 μm. Moreover, the productivity is also low. Therefore, it is also difficult to obtain the silica particle having the preferable particle size as the material of the filler by this method.

In addition, the process, in which a metallic silicon powder is lit in an atmosphere containing oxygen to form a flame to be done oxidization combustion continuously, has a problem that the purity of the made silica powder is low. Regarding the silica fine powder used for the semiconductor resin-sealing agent, the high purity is required, specifically, it is needed that there are as much as possible few uranium contents, so that a radiation error may not be occurred. However, since it is difficult to refine the metallic silicon, the silica fine powder having high purity cannot be made at low cost, by the oxidation combustion method using said metal silicon as the raw material.

EMBODIMENT OF THE PRESENT INVENTION

The present invention solves the above-mentioned problems in the conventional production processes, and provides the production process, in which the amorphous fine silica particle having the true spherical form, the suitable particle size distribution, and the high purity, is made in low cost, and relates to said silica particle itself. Moreover, the present invention also solves the above-mentioned problems in the conventional silica powder used as the additive of the electronic photograph material, and provides the amorphous fine silica particle having a little larger average particle diameter than the conventional used silica particle, the sharp particle size distribution, and the large triboelectrostatic charge.

The present invention provides the following amorphous fine silica particle and its application.

[1] An amorphous fine silica particle made by flame hydrolysis of a silicon compound, wherein said silica particle having, 0.1–0.7 μm of the average particle diameter (median size),
5–30 m$^2$/g of the specific surface area by BET, and
less than 40% of the dispersion coefficient (z) shown in the following formula [I], $$z=(Y/2X)\times 100\%  \qquad [\text{I}],$$

where X is a median size, Y is a particle diameter range, which is from 10% to 90% of an accumulative particle size.

[2] The amorphous fine silica particle according to claim [1], wherein said silica particle is used as a filler of a semiconductor resin-sealing agent.

[3] The amorphous fine silica particle according to claim [1], wherein said silica particle is used as a filler for anti-blocking of a plastic film or sheet.

[4] The amorphous fine silica particle according to claim [1], wherein said silica particle is used as an outer additional agent for a toner.

[5] The amorphous fine silica particle according to claim [1], wherein said silica particle is used for a surface protection layer or an electric charge transportation layer of a photo conductor of an electronic photograph.

[6] The amorphous fine silica particle made by a flame hydrolysis of a silicon compound, wherein said silica particle having, 0.1–0.7 μm of the average particle diameter (median size),
5–30 m$^2$/g of the specific surface area by BET,
less than 40% of the dispersion coefficient (z) shown in the following formula [I], and
more than 20 μC/m$^2$ of the absolute value of triboelectrostatic charge to the specific surface area by BET, $$z=(Y/2X)\times 100\% \qquad [\text{I}],$$

where X is a median size, Y is a particle diameter range which is from 10% to 90% of an accumulative particle size.

[7] The amorphous fine silica particle according to claim [6], wherein said silica particle is surface-treated with a silane coupling agent and/or organo-polysiloxane.

[8] The amorphous fine silica particle according to claim [6], wherein said silica particle is surface-treated by a dry method.

[9] A development agent for an electronic photograph, wherein said agent uses the amorphous fine silica particle according to claim [6], [7], or [8].

[10] A surface protection layer material of a photo conductor, wherein said material uses the amorphous fine silica particle according to claim [6], [7], or [8].

[11] A material of electric charge transportation layer, wherein said material uses the amorphous fine silica particle according to claim [6], [7], or [8].

Moreover, the present invention provides the following production processes, which produce the above-mentioned amorphous fine silica particle.

[12] A production process of an amorphous fine silica particle by leading a gaseous silicon compound into a flame to be hydrolyzed, the process also comprising, setting the flame temperature to be more than melting point of silica,
setting the silica concentration in the flame to be more than 0.25 kg/Nm$^3$,
staying the generated silica particle for a short time under the high temperature which is more than melting point of silica, and
making an amorphous silica particle having 0.1–0.7 μm of the average particle diameter (median size), and 5–30 m$^2$/g of the specific surface area.

[13] The production process of an amorphous fine silica particle according to claim [12], wherein the silica concentration in the flame (v) is 0.25–1.0 kg/Nm$^3$.

[14] The production process of an amorphous fine silica particle according to claim [12] or [13], wherein the staying time (t) of the silica particle in the flame is 0.02–0.30 seconds.

[15] The production process of an amorphous fine silica particle according to claim [12], [13], or [14], the process comprising, controlling the specific surface area (S), the median size (r), silica concentration in the flame (v), and the staying time in the flame (t), according to the following formula [II] or [III], respectively.

$$S=3.52\ (v\cdot t)^{-0.4} \qquad [\text{II}]$$

$$r=1.07\ (v\cdot t)^{0.4} \qquad [\text{III}]$$

CONCRETE EXPLANATION OF THE INVENTION

Hereafter, the present invention is explained concretely.

(I) Production Process

The production process of the present invention, which is made by leading the gaseous of silicon compounds into the flame to be hydrolyzed, comprises to set the flame temperature to be more than melting point of silica, to set the silica concentration in the flame to be more than 0.25 kg/Nm$^3$, to stay the generated silica particle for the short time under high temperature which is more than melting point of silica, and to have the amorphous silica particle having 0.1–0.7 μm of the average particle diameter (median size) and 5–30 m$^2$/g of the specific surface area.

In addition, the production process of the present invention is based on the flame hydrolyzing method to make the silica particle by leading the raw material gases of the silicon compounds into the flame to be hydrolyzed. As the silicon compounds of the raw material, the compounds, for example, silicon tetrachloride, trichloro-silane, dichloro-silane, and methltrichloro-silane, etc., are used, wherein said compounds are gaseous to be led into an oxygen-hydrogen flame, and generated the hydrolysis reaction under the high temperature. Since these gaseous silicon compounds, such as silicon tetrachloride, etc., can be distillated and refined easily, the impurities can be easily removed from the raw material, so that the silica particle having high purity can be made.

The flame is formed by using combusting gases and supporting gases, and the flame temperature is raised to more than the melting point of silica (1730° C.). As the combustible gases, hydrogen, gases containing hydrogen, and gases generating hydrogen can be used. As the supporting gases, oxygen and gases containing oxygen can be used. When the flame temperature is lower than the melting point of silica, it will be difficult to obtain the silica particle having the objective particle diameter.

These material gases (silicon compound gases), combustible gases, and supporting gases, form the flame by a combustion burner. However, in the flame hydrolyzing method of the present invention, in order to keep the time when the generated silica particle is stayed under the high temperature more than the melting point of silica, it is good that the heat quantity lost by radiation can be compensated by burning the combustible gas at the periphery part of the combustion burner. Moreover, as for a reaction container, it is preferably that said container has the structure which can bear under the elevated temperature of 1000° C. or more, and the exhaust brawer machines, etc., are set up at the exhaust side to be absorbed, and the pressure in the container is kept at the negative pressure of −200 mmAg to −10 mmAg on an atmospheric pressure standard.

In the production process of the present invention, the concentration of the silica in the flame is adjusted to be more than 0.25 kg/Nm$^3$, preferably about 0.25–1.0 kg/Nm$^3$, by controlling the amount of supplying the raw material gas, etc. When this silica concentration is less than 0.25 kg/Nm$^3$, the particle cannot be grown fully and the particle having the desired diameter is not obtained. On the other hand, when silica concentration is more than 1.0 kg/Nm$^3$, the silica becomes easily to adhere to the burner, and the controlling of particle diameter also becomes difficult.

Moreover, in the production process of the present invention, the generated silica particle by flame hydrolysis is grown up by staying in the flame for the short time under the high temperature more than melting point of silica, so that its particle diameter can be controlled. For this staying time, 0.02 to 0.30 seconds is suitable. When this staying time is less than 0.02 seconds, the growth of the particle is not enough. In addition, when this staying time is more than 0.30 seconds, the fusion of each silica particles is occurred, and the adhesion of the silica to the inside wall of the reaction container also becomes remarkably, so that it is not preferably.

In addition, the diameter of the silica particle can be controlled, by introducing the dilution gas, such as air, nitrogen gas, etc., into the raw material gas, the combustible gas, and the supporting gas to adjust the combustion temperature and the gas flux. When the flow velocity of gas is raised while increasing the amount of supplying the dilution gas to lower the flame temperature, the staying time of silica is decreased and the growth of the particle is restricted, so that the silica particle having relatively the small size, i.e., the large specific surface area, can be made.

Concretely, the specific surface area (S), the median size (r), the silica concentration in the flame (v), and the staying time in the flame (t) of the silica particle, which are made by the production process of the present invention, are controlled according to the following formula [II] or [III].

$$S=3.52\ (v \cdot t)^{-0.4} \qquad [\text{II}]$$

$$r=1.07\ (v \cdot t)^{0.4} \qquad [\text{III}]$$

Figure 3:
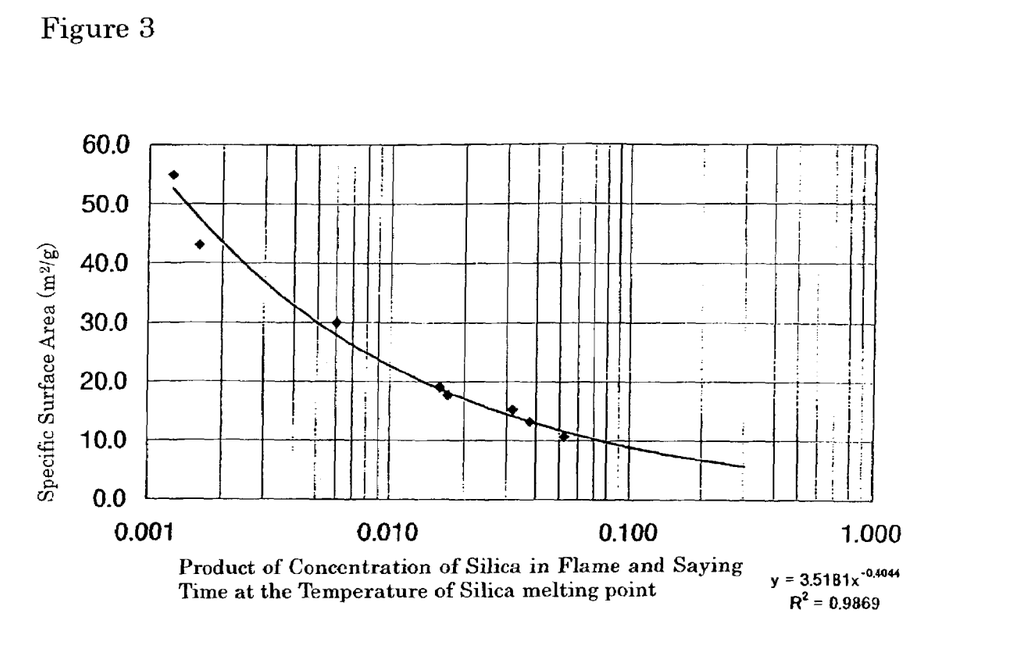
FIG. 3 Graph showing the relational expression of the specific area of the silica particle of the present invention.
Figure 4:
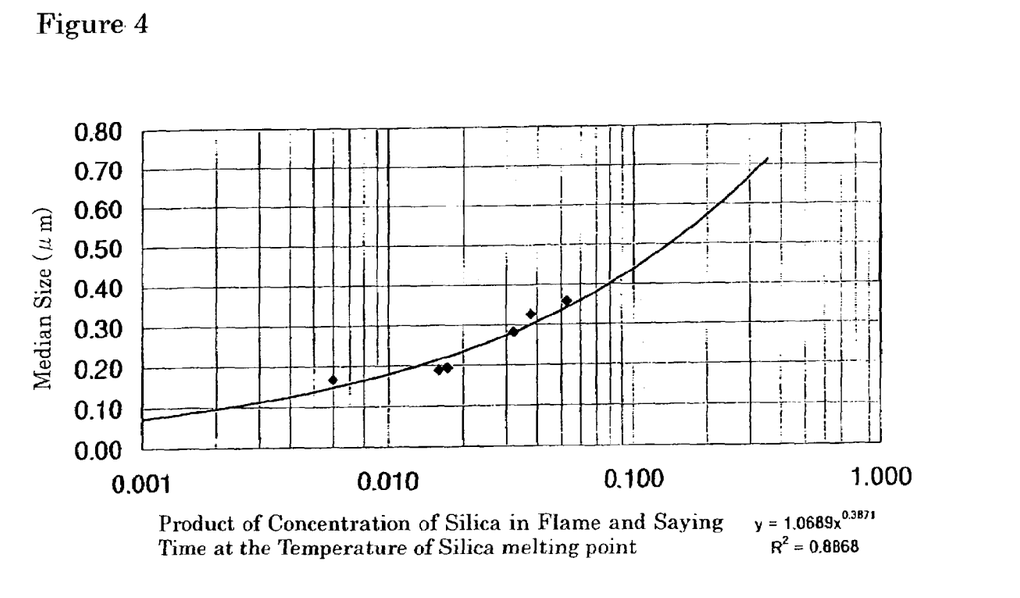
FIG. 4 Graph showing the relational expression of the median size of the silica particle of the present invention.

It is found out that the specific surface area (S) and the median size (r) of the fine silica particle, which are made by the production process of the present invention, have the relation shown in the logarithm curve expressed with the above [II] and [III] formulas to the product of silica concentration (v) and the staying time (t) in the flame, as shown in the graphs of FIG. 3 and FIG. 4. Therefore, the specific surface area (S) and the median size (r) of the fine silica particle can be controlled by letting this silica concentration and the staying time to be factors. Moreover, the silica concentration in the flame and the staying time are controlled according to the objective specific surface area and the median size.

The silica particle taken out from the reaction container is quickly cooled so that a sintering, a fusion, a re-crystal, or a surface change may not be occurred, and is dissociated to be recovered at the temperature more than the dew point of water or other reactive materials which tend to condense. As this recovery equipment, a dust catcher, a cyclone, or a bug filter etc. can be used. Since a halogen, a halogen compound, and a nitrogen oxide, etc., such as hydrogen chloride contained in the combustion gas, are adsorbed on the recovered silica particle, it is preferable to remove these materials. These volatile anion impurities adsorbed on the silica particle can be removed or decreased by heat-treating in an electric furnace, a fluidized bed, and a rotary kiln, etc. Any of a continuous processing or a batch processing can be done as this heat-treatment. Regarding this heat-treatment, although the effect of removal/reduction is so high that the treating time is long at high temperature, since the condensation or the fusion of the silica particle etc. are caused at high temperature more than 800° C., so the temperature less than this temperature is preferably. For using as a semiconductor material, although the silica having high purity with few impurities as much as possible is required, the silica particle suitable for the semiconductor material can be obtained, by removing such adsorption impurities.

(II) Fine Silica Particle

According to the above-mentioned production process, the amorphous fine silica particle having 0.1–0.7 μm of the average particle diameter (median size), 5–30 m$^2$/g of the specific surface area, and less than 40% of the dispersion coefficient (z) expressed with the following formula [1], can be made.

$$Z=(Y/2X) \times 100\% \qquad [\text{I}]$$

Where, X is the median size and Y is the particle size range, in which the accumulative particle size is from 10% to 90%. As shown in the formula [1] clearly, the dispersion coefficient z shows the distribution state, where the median size of the above-mentioned silica particle is centered, and regarding the particles having small value of this coefficient, the particle size distribution is concentrating near the median size. Moreover, regarding each of particle size ranges of less than 10% of the accumulative particle size, and more than 90%, the distribution error becomes large, so that it is based on the particle size range Y, in which the accumulative particle size is from 10% to 90%.

Furthermore, the dispersion coefficient (z) of the conventional silica particle is more than 43%, in comparison with the silica particle of the present invention, and has larger distribution than the present invention. Therefore, the conventional silica particle needs many amounts of addition comparatively, at the time of giving the sliding property between particles. On the other hand, regarding the fine silica particle of the present invention, since the distribution is concentrated near the median size and the particle size is more remarkably uniform than conventional particle, there is an advantage that the effect can be obtained with comparative little addition, at the time of giving the sliding property between particles.

Moreover, the fine silica particle of the present invention is the particle, which can be isodispersed easily. Thus, regarding the fine silica particle of the present invention, since the median size is smaller than the conventional silica particle, and the particle size distribution is concentrated near the median size, and the particle size is remarkably uniform, so it is suitable as the silica filler used in order to improve the fluidity, and burr-proof property, etc. of the resin compound for semiconductors. By the way, regarding the silica particle having the particle size smaller than the above-mentioned range and the large specific surface area, the fluidity of the compound is fallen. On the other hand, regarding the silica particle having the particle diameter larger than the above-mentioned range and the small specific surface area, the burr-proof property is fallen.

Figure 2:
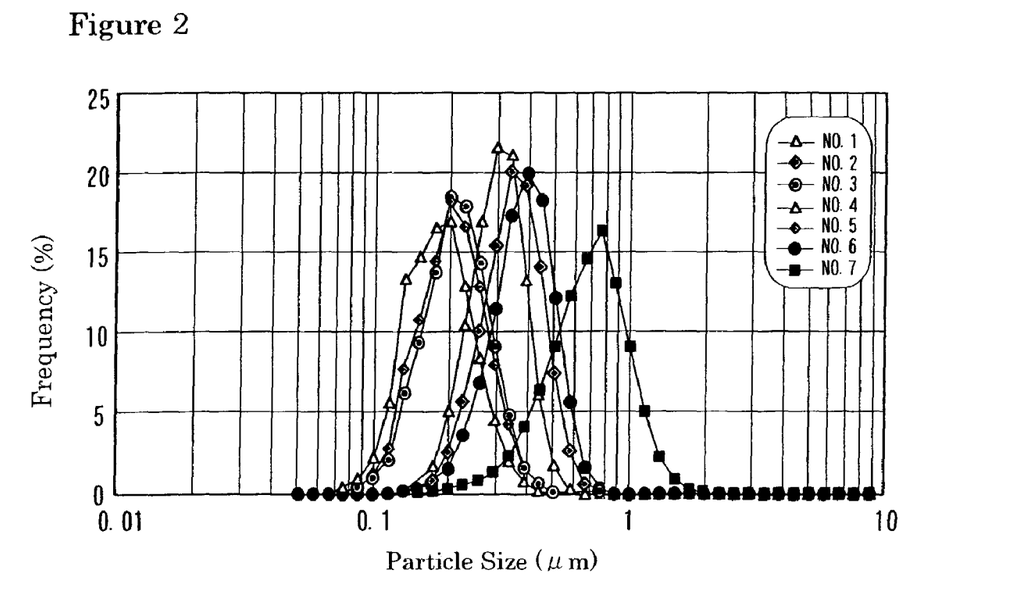
FIG. 2 Graph showing the particle size distributions of the silica particles of the present invention and the conventional silica particle.

Furthermore, the silica particle of the present invention is a nearly perfect amorphous particle, and has the particle forming like a near true sphere. Therefore, said silica particle indicates the superior effect as the filler of the resin compound for semiconductors. Moreover, as shown in FIG. 2 with contrast, regarding the conventional silica particle in commercial sale as the filler, etc., the peak of the particle size distribution is deviated to the 1 μm side rather than the silica particle of the present invention, and the particle diameter is larger than the silica particle of the present invention.

The fine silica particle of the present invention is also suitable as the filler for anti-blocking of the plastic film or sheet. The filler for anti-blocking is used in order to prevent blocking by forming fine irregularity on the surface of the film or the sheet, and it is required that the particle has the larger size than the filler for the wear-proof or the scratch-proof, the less size than 1 μm, and the sharp particle size distribution. In addition, regarding the filler for anti-blocking, the chemical stability is needed in order to not leave away from the plastic film or sheet, and it is also required that said filler does not generate gases at the time of the making or forming process, and has high affinity with the resin. The fine silica particle of the present invention is suitable as the filler for anti-blocking.

Since the silica particle of the present invention uses gaseous silicon compounds, such as silicon tetrachloride gas, etc., as the raw material, it is easy to remove impurities by distillation, and the silica particle having high purity with few uranium contents etc. can be obtained. Concretely, the pure fine silica particle can be obtained, wherein the uranium content is less than 0.5 ppb, the contents of aluminum and iron are less than 500 ppm respectively, the calcium content is less than 50 PPm, and the contents of sodium, manganese, chromium, and phosphorus are less than 10 ppm respectively. Moreover, since the adsorption impurities are removed and reduced by the heat-treatment at the time of the recovering the silica particle made by flame hydrolysis, the silica particle having high purity is obtained. Regarding the semiconductor memory, it is required that said memory has as few uranium contents as possible in order to prevent the soft error induced by α ray contained in the material. Therefore, the silica particle of the present invention having high purity is also preferably from above-mentioned points.

Thus, regarding the fine silica particle of the present invention, the dispersion coefficient (z) is less than 40%, the particle size is concentrated on near the median size, the particle size is much more uniform than the conventional particle, and the isodispersion is possible easily. Moreover, the amorphous silica particle of the present invention obtained by the flame hydrolyzing method has high purity. Therefore, this particle is suitable as the outer additional agent and inner additional agent of the toner for the electronic photograph. Furthermore, this particle is also suitable as the material of the development agent for the electronic photograph, the surface protection layer of the photo conductor, and the electric charge transportation layer.

Since the amorphous silica particle of the present invention has the above-mentioned average particle size, specific surface area, and dispersion coefficient, said particle is excellent in the contact to iron powder etc., and can have the large triboelectrostatic charge, where its absolute value is more than 20 μC/m$^2$ as the triboelectrostatic charge to the specific surface area by BET. In addition, the triboelectrostatic charge to the weight of the silica particle has been made into the index in general, but, in the triboelectrostatic charge to weight, there is a problem that when the condensation powder is used for dispersion, the triboelectrostatic charge varies a lot so that it is hard to understand an exact electrification state. The dispersion property of the powder has big influence on the electrification, and when the powder is used as the material of the development agent for the electronic photograph, such influence is linked with the quick standup of the electrification directly. In addition, regarding the amorphous silica particle of the present invention, since the absolute value of the triboelectrostatic charge to the specific surface area by BET is more than 20 μC/m$^2$, when said particle is added to the toner for the electronic photograph, the dispersion property is well, and the development agent having the quick standup of the electrification can be obtained.

The amorphous silica particle of the present invention can stabilize the triboelectrostatic charge by surface treating with the silane coupling agent or organopolysiloxane. Concretely, the silane coupling agents, such as trimethyl-chloro-silane, dimethyl-dichloro-silane, methyl-trichloro-silane, trimethyl-alkoxy-silane, dimethyl-alkoxy-silane, methyl-trialkoxy-silane, and hexamethyl-disilazane, or the denatured silicone oil, etc., containing organopolysiloxane or organopolysiloxane, such as dimethyl silicone oil, methylhydrogen silicone oil, phenyl silicone oil, non-reactivity silicone oil, or reactive silicone oil, can be used.

Neither the surface treatment processes nor conditions are limited. The conventional surface treatment processes can be used. For example, the uniformly surface treated silica particle is made by the dry production process, that is, at first, the predetermined amount of the silane coupling agent or organopolysiloxane is dropped or sprayed to the metal oxide powder to be dispersed enough with the solvent according to the necessity, and said dispersed powder is stirred at the heating temperature of more than 50° C., preferably more than 100° C., the most preferably 100–400°C., for 0.1–5 hours, preferably 1–2 hours, and be cooled.

Since the amorphous silica particle of the present invention has the above-mentioned particle size characteristics, i.e., the average particle size, the dispersion coefficient, etc., and the triboelectrostatic charge characteristics, it is suitable as the material of the development agent for the electronic photograph, the surface protection layer of the photo conductor, or the electric charge transportation layer.

EXAMPLE OF THE INVENTION

Hereafter, the invention will be explained concretely with the following examples.

Example 1

Figure 1:
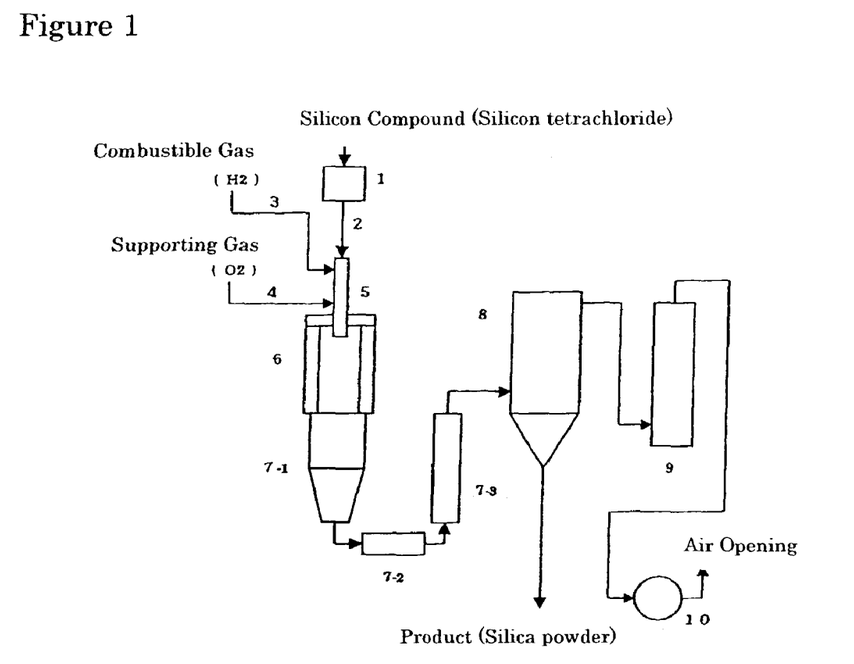
FIG. 1 The composition figure of the production equipment doing the production process of the present invention.

As shown in FIG. 1, the amorphous fine silica particle was made as follows by using the production equipment comprising the evaporator 1 evaporating and feeding the silicon compound as the raw material, the feed pipe 2 feeding the silicon compound gas as the raw material, the feed pipe 3 feeding the combustible gas, the feed pipe 4 feeding the supporting flame gas, the burner 5 linked to these feed pipes 2–4, the reaction container 6 doing the flame hydrolysis reaction, the cooling pipe 7 with the down stream of the reaction container 6, the recovery equipment 8 recovering the made silica powder, the exhaust gas treatment equipment 9 at more down stream, and the exhaust fan 10. Moreover, the inner wall of the reaction container 6 was lined by the alumina brick so that it could be resisted at the high temperature more than 1000° C. to be used.

The feed pipe of the supporting flame gas was opened and oxygen gas was fed to the burner, and after the ignition burner (illustration was omitted) was fired, the feed pipe of the combustible gas was opened to feed hydrogen gas to burner to form flame. In addition, the silicon tetrachloride was gasified at the evaporator 1 to be fed to said flame, and the flame hydrolysis reaction was done under the condition shown in Table 2, then the generated silica powder was recovered by the bag filter of the recovery equipment 8. The exhaust gas after recovering the powder was treated at the exhaust gas treatment equipment 9 to be exhausted through the fan 10. The amount of silicon-tetrachloride gas as the raw material, the amount of hydrogen gas and oxygen gas, the concentration of silica and the staying time in the flame, and the particle size and the dispersion coefficient of the generated silica particle, were shown in Table 1 and FIG. 2. Moreover, regarding these silica particles, after dispersing these silica particles into the iron powder carrier by 0.2 weight % concentration for 5 minutes, the triboelectrostatic charge was measured, i.e., the absolute value measured by TB-200 made by Toshiba Chemical CORP, after blowing with nitrogen of 1 kgf/cm$^2$ for 1 minute. These values were shown in Table 1. In addition, the value of the conventional silica particle was shown comparatively. Moreover, the particle size distribution of the example No 1 to No. 6 and the conventional particle were shown in FIG. 2.

TABLE 1

| No. | 1 | 2 | 3 | 4 | 5 | 6 | Conventional particle |
|---|---|---|---|---|---|---|---|
| Production Condition | | | | | | | |
| Silicon Tetrachloride (kg/hr) | 200 | 125 | 100 | 100 | 150 | 150 | |
| Hydrogen (Nm$^3$/hr) | 60 | 50 | 60 | 60 | 60 | 45 | |
| Oxygen (Nm$^3$/hr) | 60 | 28 | 33 | 33 | 33 | 25 | |
| Silica Concentration (kg/Nm$^3$) | 0.50 | 0.53 | 0.41 | 0.41 | 0.53 | 0.63 | |
| Staying Time (sec) | 0.012 | 0.030 | 0.042 | 0.078 | 0.071 | 0.083 | |
| Produced Silica Particle | | | | | | | |
| Specific Area (m$^2$/g) | 30.0 | 19.1 | 17.7 | 15.3 | 13.2 | 10.7 | 5.5 |
| Median Size (μm) | 0.195 | 0.220 | 0.240 | 0.299 | 0.348 | 0.370 | 0.65 |
| 10% Accumulative Particle Size (μm) | 0.116 | 0.126 | 0.132 | 0.182 | 0.227 | 0.244 | 0.988 |
| 90% Accumulative Particle Size (μm) | 0.250 | 0.280 | 0.285 | 0.386 | 0.454 | 0.498 | 0.389 |
| Y: Particle Size Range (μm) | 0.134 | 0.154 | 0.153 | 0.204 | 0.227 | 0.254 | 0.599 |
| z: (Y/2X) × 100(%) | 34.4 | 35.0 | 35.0 | 34.1 | 32.6 | 34.3 | 46.1 |
| Triboelectrostatic charge [μC/m$^2$] | 20.5 | 21.0 | 21.0 | 27.0 | 30.0 | 32.0 | 15.0 |

Both of 10% Accumulative Particle Size and 90% Accumulative Particle Size are accumulative reached particle sizes.
X is median size.
Y is the particle size range from 10% accumulative particle size (A) to 90% accumulative particle size (B), i.e., Y = B − A.
Z is the dispersion coefficient.
Silica Concentration is the concentration in the flame.
Triboelectrostatic charge is the absolute value.

As shown in Table 1 and FIG. 2, the silica particle of No. 1 to No. 6 has 10.7 to 30.0 m$^2$/g of the specific surface area, 0.195 to 0.37 μm of the average particle diameter (median size), 31 to 35% of the dispersion coefficient, and 20.5 to 32.0 of the absolute value of the triboelectrostatic charge with the carrier, and all of these values are in the range of the present invention. On the other hand, regarding the conventional silica particle, although the specific surface area and the median size are in the range of the present invention, the dispersion coefficient is larger than the silica particle of the present invention, and the peak of the particle size distribution is larger than the silica particle of the present invention. Moreover, the absolute value of the triboelectrostatic charge is also small.

Regarding to the silica particles of No. 1 to No. 6, the relationships of the specific area (S) and the median size (r) to the product of the silica concentration in the flame (v) and the staying time (t), are shown in FIG. 3 and FIG. 4. From this result, it is found that the product of the silica concentration in the flame (v) and the staying time (t) are in the relation between the following formulas [II] and [III], to the specific surface area (S) and the median size (r).

$$S = 3.52 \ (v \cdot t)^{-0.4} \quad [II]$$

$$r = 1.07 \ (v \cdot t)^{0.4} \quad [III]$$

Example 2

The resin having the composition shown in Table 2, in which the phenol novolac curing agent is added to biphenyl type epoxy resin, is blended with the filler, in which the silica powders of example 1 (No. 1–6) are added to the standard filler, and is prepared to the compound for an examination. This compound was mulled for 5 minutes by the heated mixing roll mills, that are 2 rolls, and its spiral flow and the length of burr were measured. This result was shown in Table 3. Moreover, the silica filler is prepared so that the weight ratio of the silica filler to the standard filler in all fillers may become 5% and 10%, and the filling ratio of the silica filler in the compound was 88.0% by weight. As the standard filler, the spherical silica particle having 22.4 µm of the average particle diameter and 2.3 m²/g of the specific surface area, is used. Regarding the measurement method, after injecting each sample to each metallic mould for the measurement, at 180° C. of the heating temperature, 70 kg/cm²G of the injection pressure, and 100 seconds of the injection time, the spiral flow and the burr length were measured. As clearly shown from the contrast with the comparison basis, regarding the samples added the silica particle of the present invention, the spiral flow and the burr length were reduced and this effect was almost proportional to the addition.

TABLE 3

| Silica Particle | Addition (g) | Spiral Flow (inch) | Burr length (mm) |
| --- | --- | --- | --- |
| No. 1 | 2.5 | 27.0 | 6.1 |
|  | 5.0 | 23.0 | 4.2 |
|  | 10.0 | 19.0 | 1.9 |
| No. 2 | 2.5 | 25.5 | 5.6 |
|  | 5.0 | 23.5 | 4.3 |
|  | 10.0 | 23.0 | 2.2 |
| No. 3 | 2.5 | 29.5 | 6.1 |
|  | 5.0 | 26.0 | 5.1 |
|  | 10.0 | 23.5 | 1.9 |
| No. 4 | 2.5 | 32.5 | 6.1 |
|  | 5.0 | 32.0 | 5.1 |
|  | 10.0 | 27.0 | 3.2 |
| No. 5 | 2.5 | 33.5 | 7.3 |
|  | 5.0 | 33.0 | 5.0 |
|  | 10.0 | 28.0 | 3.2 |
| No. 6 | 2.5 | 35.5 | 5.9 |
|  | 5.0 | 35.5 | 3.8 |
|  | 10.0 | 35.5 | 4.2 |
| Comparison Basis | 0.0 | 31.9 | 8.5 |

Example 3

100 weight part of the silica fine powder of No. 1 in Table 1 was used to be put into a mixer, and 5 weight part of the organo-polysiloxane was dropped at said powder while being stirred under nitrogen atmosphere, and said mixed powder was heated for 1 hour at 300° C. with stirring to be cooled. Regarding this mixed silica powder, the absolute value of the triboelectrostatic charge with the iron powder carrier was measured, like Example 1, to be 25.2 µC/m². In addition, the hydrophobic ratio by the permeability method was 95%, the specific surface area was 20 m²/g by BET, and the amount of carbon was 1.5% by weight. Moreover, 0.5% of this silica fine powder and the commercial silica powder (RX200 made by NIPPON AEROSIL CORP) were added to the negative electrification toner having 7 µm (K-30 made by Toshiba Chemical CORP) to be stirred and mixed to prepare the toner composite. When the fluidity of this toner composite was measured, the transmission ratio in the 45µ screen was 83%, and it had the good fluidity. Furthermore,

TABLE 2

| Composition [Name of used material] | Blending ratio of Resin (wt %) | Blending ratio of Compound (wt %) |
| --- | --- | --- |
| Epoxy Resin (Biphenyl type) [Yuka Shell Epoxy Corp.: YH 4000 H] | 53.7 | 6.45 |
| Curing agent (Phenol novolac type) [Nippon Kayaku Corp.: PN-80] | 31.4 | 3.77 |
| Fire Retardant (Br-biphenyl A) [Yuka Shell Epoxy Corp: Epicort5050] | 5.4 | 0.65 |
| Fire Retardant (Antimony Oxide) | 5.4 | 0.65 |
| Release Agent (Karunaba Wax) | 1.1 | 0.13 |
| Coloring Agent (Carbon Black) | 1.6 | 0.19 |
| Silane Coupling Agent [Shinestu Chemical Co.: KBM 403] | 0.6 | 0.07 |
| Curing Acceleration Agent (Triphenyl Phosphine) | 0.8 | 0.09 |
| Silica Powder (Standard Filler + Sample) Standard Filler: 90~100% Fine Sample: 0~10% |  | 88.00 |
| Sum | 100.0 | 100.00 | regarding the samples, in which this toner composite, i.e., 4% by weight, and the ferrite carrier, i.e., 96% by weight of FS-02, were triboelectrified respectively for 1 hour and 120 hours, when the triboelectrostatic charge of each sample was measured to be calculated its ratio by using the blow-off electrification measuring apparatus (TB-220 made by Toshiba Chemical CORP), it was found that the ratio of the electrification is 1.1, and there were few variations of the electrification by the difference of the friction time.

Next, when 50,000 sheets were copied using the above-mentioned toner composite by a commercial copying machine, there is no poor picture, such as a concentration change of the picture, a fogging, and a white omission, and they showed good picture characteristics. Moreover, when the surface layer of the photo conductor after copying was observed with the microscope (VH-600 made by KEYENCE CORP), there were no damages and the good surface was kept.

Example 4

100 weight part of the silica fine powder of No. 6 in Table 1 was used to be put into the mixer, and 5 weight part of the hexamethyl-disilazane (HMDS) was dropped at said powder, while being stirred under nitrogen atmosphere, and said mixed powder was heated and stirred for 3 hour at 200° C. to be cooled. Regarding said silica powder, when the absolute value of the trioelectrification with an iron powder carrier was measured, it was 47.6 μC/m². In addition, the hydrophobic ratio by the permeability method was 98%, the specific surface area was 8 m²/g by BET, and the amount of carbon was 0.15% by weight. The toner composite was prepared like Example 3 using this silica particle. The permeability of 45μ screen of this toner composite was 90%, and it showed good fluidity. Moreover, regarding this toner composite, when the ratio of the triboelectrostatic charge for 1 minute and 120 minutes, was measured, the ratio was 1.2, and it was confirmed that there were few variations of the triboelectrostatic charge by the difference of the friction time. Furthermore, when 50,000 sheets were copied like Example 3 using this toner composite, there was no poor picture, such as the concentration change of the picture, the fogging, and the white-omission, and they showed good picture characteristics. In addition, there were no damages on the surface layer of the photo conductor after copying, and the good surface was kept.

[Possibility of use on Industry]

According to the process for production of the present invention, the silica particle having 0.1–0.7 μm of the average particle diameter (median size), 5–30 m²/g of the specific surface area, and the sharp particle size distribution less than 40% of the dispersion coefficient (z), can be obtained. This silica particle has the particle shape being near the true sphere, and the particle size is remarkably uniform. Therefore, this silica particle is suitable as the semiconductor resign-sealing agent and the anti-blocking filler for the plastic film or sheet, etc.

Moreover, the preferable amorphous fine silica particle of the present invention can obtain the strong electrification having more than 20 μC/m² as the absolute value of triboelectrostatic charge. In addition, the silica particle has the high purity, and since there is almost no pore on the particle surface, there is very little absorption of moisture. Furthermore, the standup of the electrification is quickly, and said electrification can be kept for a long time. Moreover, since the particle size is large, said particle is not buried into the inside of the toner by the prolonged dispersion. Therefore, said particle can be used for a contact point improvement between the protection layer of the surface of the photo conductor and the paper, and is suitable as the material of the developer for the electronic photograph, the surface protection layer of the photo conductor, or the electric charge transportation layer.

What is claimed is:

1. An amorphous fine silica particle made by flame hydrolysis of a silicon compound, wherein said silica particle has an average particle diameter (median diameter) of from 0.1 to 0.7 μm, a specific surface area by BET of from 5 to 30 m²/g, and a dispersion coefficient (z) ranges from 31% to less than 40% as shown in the following formula [I], $$z=(Y/2X)\times 100\%  \qquad [I]$$

wherein X is a median size, Y is a particle size range which is from 10% to 90% of an accumulative particle size.

2. A filler of an epoxy molding compound, comprising the amorphous fine silica particle according to claim 1.

3. A filler for anti-blocking of a plastic film or sheet, comprising the amorphous fine silica particle according to claim 1.

4. An external additive for a toner, comprising the amorphous fine silica particle according to claim 1.

5. A surface protection layer or an electric charge transportation layer of a photo conductor of an electronic photograph, comprising the amorphous fine silica particle according to claim 1.

6. An amorphous fine silica particle made by a flame hydrolysis of a silicon compound, wherein said silica particle has an average particle diameter (median size) of from 0.1 to 0.7 μm, a specific surface area by BET of from 5 to 30 m²/g, a dispersion coefficient (z) ranges from 31% to less than 40% as shown in the following formula [I], and an absolute value of triboelectrostatic charge to the specific surface area by BET is more than 20 μc/m²

$$z=(Y/2X)\times 100\%  \qquad [I]$$

wherein X is a median size, Y is a particle size range which is from 10% to 90% of an accumulative particle size.

7. The amorphous fine silica particle according to claim 6, wherein said silica particle is surface-treated with a glints coupling agent, an organo-polysiloxane or a combination thereof.

8. The amorphous fine silica particle according to claim 6, wherein said silica particle is surface-treated by a dry method.

9. A development agent for an electronic photograph, comprising the amorphous fine silica particle according to claim 6.

10. A surface protection layer material of a photo conductor, comprising the amorphous fine silica particle according to claim 6.

11. A material of an electric charge transportation layer, comprising the amorphous fine silica particle according to claim 6.

12. A process for producing an amorphous fine silica particle, said process comprising
   leading a gaseous silicon compound into a flame to be hydrolyzed to form said silica particle,
   maintaining said silica particle for a time at a temperature greater than the melting point of silica, and
   forming said amorphous fine silica particle having an average particle diameter (median size) of from 0.1 to 0.7 μm and a specific surface area of from 5 to 30 m²/g, a dispersion coefficient (z) ranges from 31% to less than 40% as shown in the following formula [I], $$z=(Y/2X)\times100\% \quad [\text{I}]$$

wherein X is a median size, Y is a particle size range which is from 10% to 90% of an accumulative particle size;

wherein a flame temperature is greater than the melting point of silica and a silica concentration in the flame (v) is more than 0.25 kg/Nm³.

13. The process according to claim 12, wherein the silica concentration in the flame (v) is from 0.25 to 1.0 kg/Nm³.

14. The process according to claim 12, wherein a residence time (t) in the flame of the silica particle is from 0.02 to 0.30 seconds.

15. The process according to claim 12, further comprising, controlling a specific surface area (S), a median size (r), a silica concentration in the flame (v), and a staying time in the flame (t), according to the following formula [II] or [III], respectively.

$$S=3.52\ (v\cdot t)^{-0.4} \quad [\text{II}]$$

$$r=1.07\ (v\cdot t)^{0.4} \quad [\text{III}].$$

16. A filler of an epoxy molding compound, comprising the amorphous fine silica particle according to claim 1 wherein the dispersion coefficient (z) ranges from 31% to 35%.

17. A filler for anti-blocking of a plastic film or sheet, comprising the amorphous fine silica particle according to claim 1 wherein the dispersion coefficient (z) ranges from 31% to 35%.

18. An external additive for a toner, comprising the amorphous fine silica particle according to claim 1 wherein the dispersion coefficient (z) ranges from 31% to 35%.

19. A surface protection layer or an electric charge transportation layer of a photo conductor of an electronic photograph, comprising the amorphous fine silica particle according to claim 1 wherein the dispersion coefficient (z) ranges from 31% to 35%.

* * * * *